United States Patent
Cline

[19]

[11] Patent Number: 5,815,928
[45] Date of Patent: Oct. 6, 1998

[54] PORTABLE POWERED LAWN AND GARDEN TOOL

[75] Inventor: Robert T. Cline, Bethany, La.

[73] Assignee: WCI Outdoor Products, Inc., Cleveland, Ohio

[21] Appl. No.: 508,367

[22] Filed: Jul. 28, 1995

[51] Int. Cl.$^6$ .................................. F01C 1/06; A01D 1/14
[52] U.S. Cl. .......................... 30/276; 30/347; 30/DIG. 5; 172/13; 173/170
[58] Field of Search ............................. 30/276, 347, 122, 30/DIG. 5; 172/13.14; 56/12.7, 16.9, 236, 295; 173/170

[56] References Cited

U.S. PATENT DOCUMENTS

| | | |
|---|---|---|
| D. 250,450 | 12/1978 | Tiedemann . |
| 3,219,129 | 11/1965 | Yamada . |
| 3,453,732 | 7/1969 | Wilkin . |
| 4,148,141 | 4/1979 | Hoff . |
| 4,286,675 | 9/1981 | Tuggle ........................................ 30/276 |
| 4,451,983 | 6/1984 | Johnson et al. . |
| 4,463,498 | 8/1984 | Everts . |
| 4,505,040 | 3/1985 | Everts . |
| 4,733,471 | 3/1988 | Rahe . |
| 4,817,738 | 4/1989 | Dorner et al. ........................ 30/276 X |
| 4,825,548 | 5/1989 | Driggers ..................................... 30/276 |
| 4,899,446 | 2/1990 | Akiba et al. . |
| 5,272,813 | 12/1993 | Wolf et al. . |
| 5,345,684 | 9/1994 | Shoup et al. .............................. 30/276 |

*Primary Examiner*—Douglas D. Watts
*Attorney, Agent, or Firm*—Marc A. Hubbard

[57] ABSTRACT

A trimmer (10) has a power source (12) and a tabular drive shaft housing (32) for coupling the power source (12) to a rotating working element. The drive shaft housing (32) is rotatable with respect to the power source (12) and a handle (26) which is fixed to the power source, such that rotation of the drive shaft (32) allows the plane of the working element to be re-oriented. Rotation of the drive shaft housing is fixed by a coupling latch (38) disposed within the handle. An external trigger (46) located on the handle is provided for manually decoupling the coupling latch for allowing rotation of the handle.

17 Claims, 3 Drawing Sheets

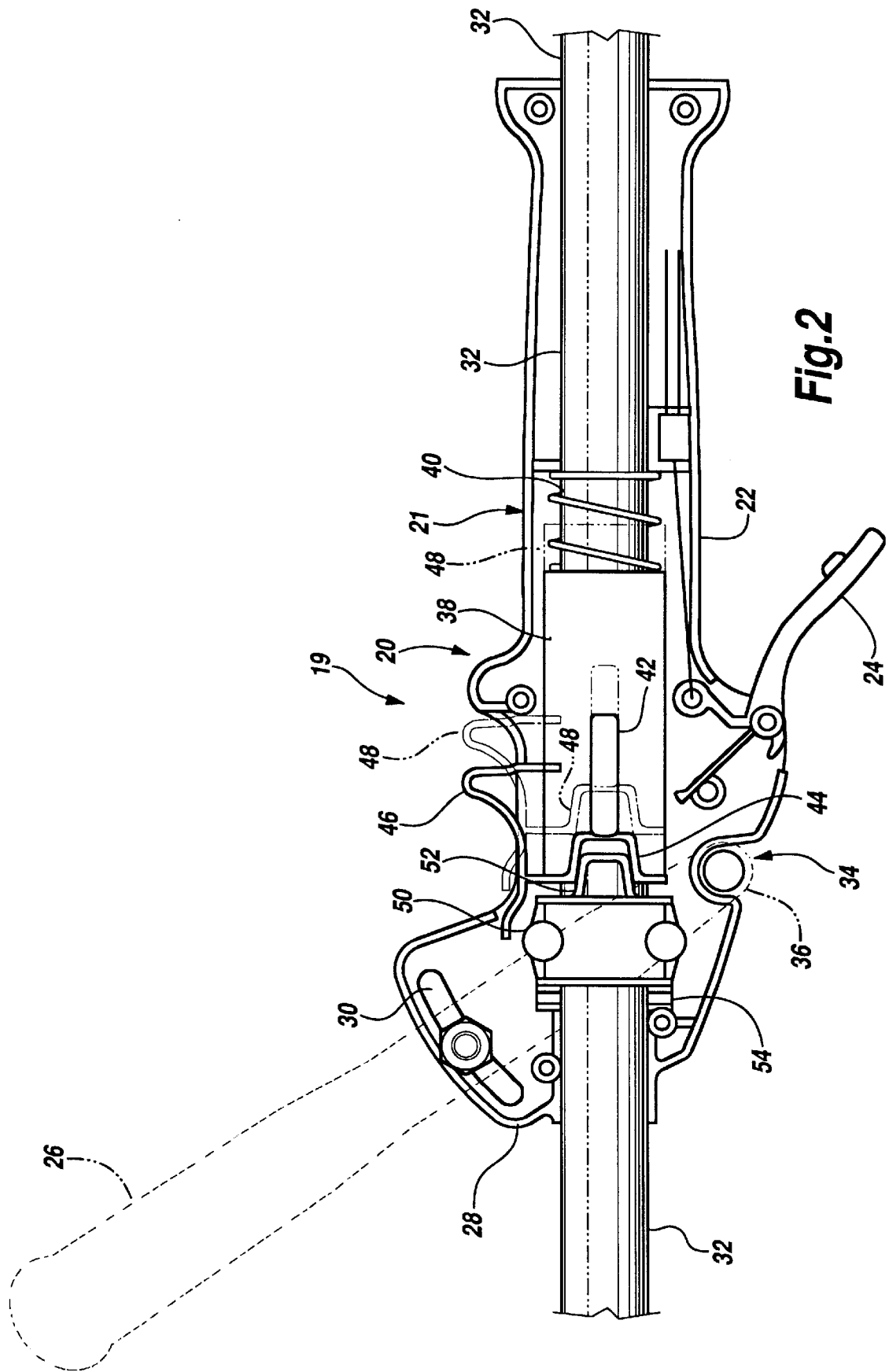

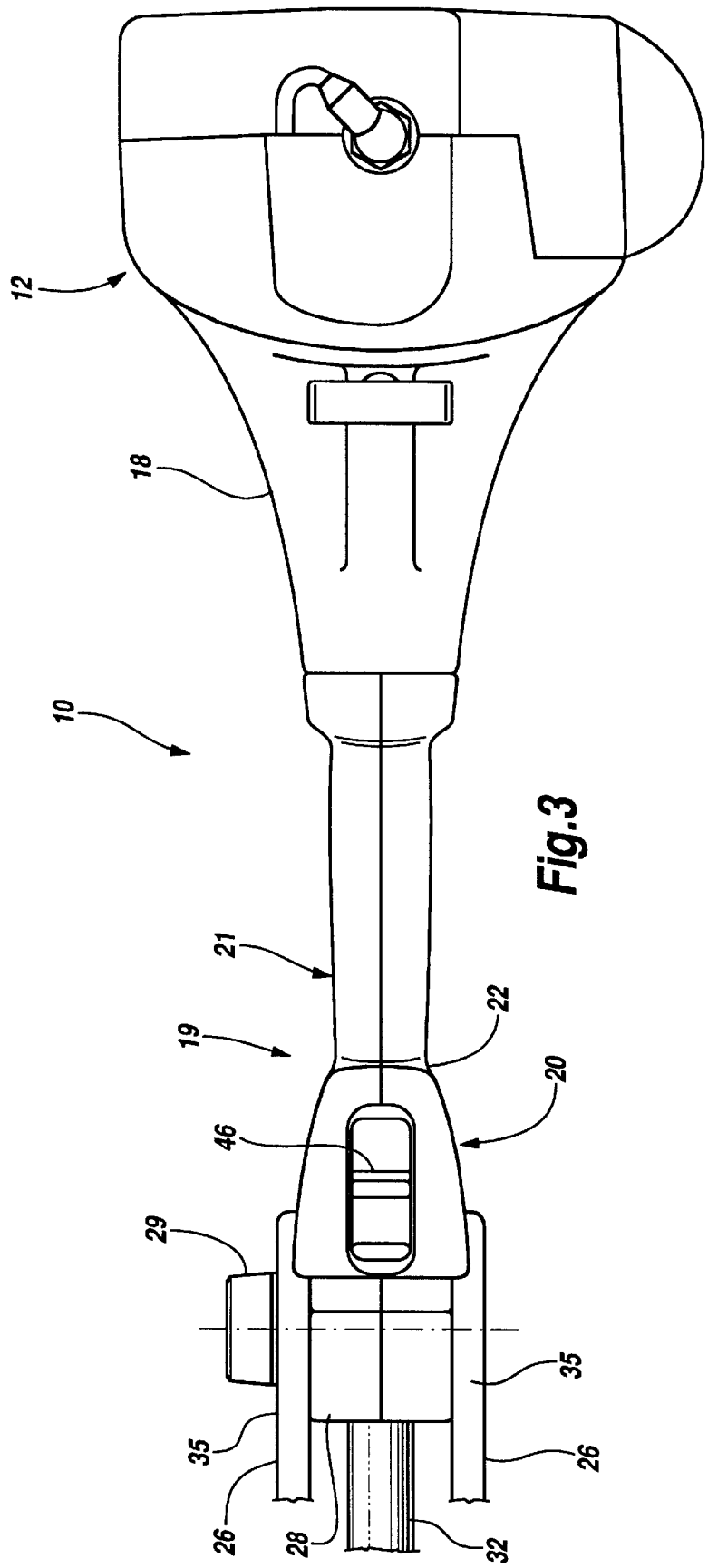

PORTABLE POWERED LAWN AND GARDEN TOOL

TECHNICAL FIELD AND BACKGROUND

The present invention relates generally to portable power tools having elongated shafts through which rotational power is transmitted from a rotational power source to a rotational working end.

Portable power tools of this variety typically include a small internal combustion engine or electric motor connected to a rotationally driven working element by a drive shaft extending through an elongated hollow, tubular housing. An example of such a tool is a flexible line trimmer.

SUMMARY OF THE INVENTION

According to the present invention, a portable, hand-held power tool having a rotary power source driving a rotating working implement through an elongated drive shaft, includes a tubular drive shaft housing which can be selectively rotated to re-orient the plane of rotation of the working implement with respect to a main handle with which the tool is carried. No tools are required to re-orient the working implement. Neither the drive shaft nor the drive shaft housing must be split to enable the reorientation. Couplings between the drive shaft and the power source, and between the drive shaft and the working implement, need not be specially modified.

Additionally, according to another aspect of the invention, an assist or auxiliary handle is incorporated with the main handle such that no re-orientation of the auxiliary handle is required. The assist handle is, furthermore, permitted to be adjusted in both longitude and height to accommodate the preferences of a user.

The invention is especially useful for flexible line trimmers and the like which are commonly used to trim lawns by orienting the plane of the flailing cutting line parallel to the ground and to edge lawns by orienting the plane of the cutting line perpendicular to the ground.

These and other aspects and advantages of the invention will be apparent from the following description of a preferred embodiment, as illustrated in the accompanying drawings.

DESCRIPTION OF THE DRAWINGS

For a more complete understanding of the present invention and the advantages thereof, reference is made to the following detailed description taken in conjunction with the accompanying drawings wherein:

FIG. 2 is a cross-sectional view of a handle portion of the trimmer of FIG. 1 in accordance with the present invention; and FIG. 3 is a top view of the trimmer shown in FIG. 1.

DETAILED DESCRIPTION

Figure 1:
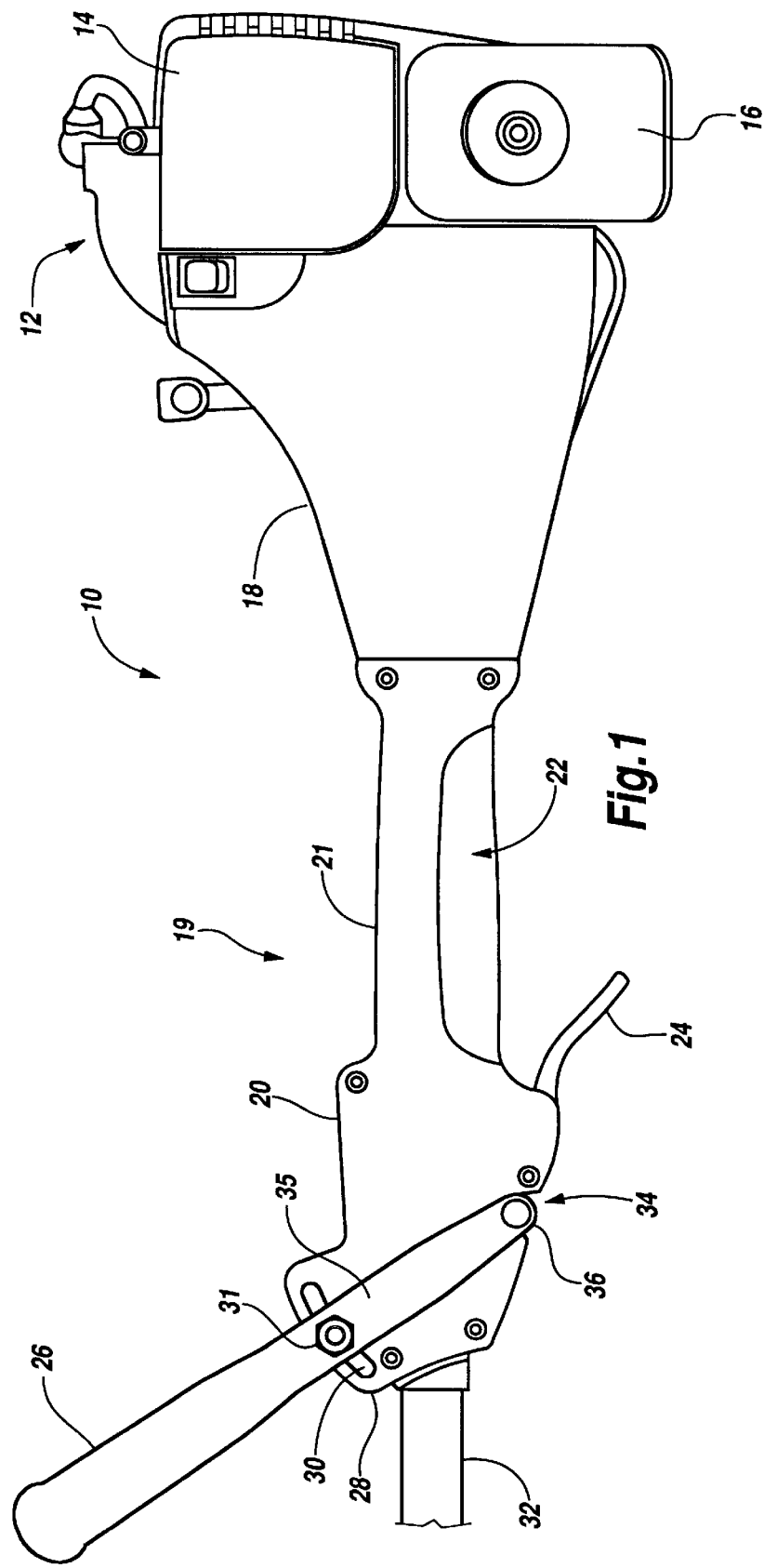
FIG. 1 is a side view of a portable lawn trimmer in accordance with the present invention.

With reference to the drawings, like reference characters designate like or similar parts throughout the drawings.

With reference to FIGS. 1 and 3, there is shown a trimmer 10 having a power source 12. The power source includes an internal combustion engine, which serves as a rotary power source, a motor housing 14, a gas tank 16 and a fan housing 18. The trimmer also includes a tubular drive shaft housing 32 carrying a drive shaft (not shown). The drive shaft housing 32 (and drive shaft) extend from the power source 12 to a remote working element (not shown). The drive shaft provides rotational power to the remote working element such as a flexible line head or rigid metal or plastic blade. As will be understood, the working element (not shown) can be any device that requires rotational power to be delivered via the drive shaft, such as a cutting element or other device typically used on line trimmers, lawn edgers, brush cutters, shaft mounted blowers, snow throwers and the like.

Handle system 19 includes a two piece housing portion 22, which in turn includes a coupling portion 20 and a main handle portion 21. The handle system further includes a trigger 24 for controlling the throttle of the engine and an assist handle 26. The drive shaft and drive shaft housing 32 extend through the handle system 19 and into fan housing 18. The drive shaft which is carried in the drive shaft housing is coupled to the drive shaft of the engine in a conventional manner. The terminating end of the drive shaft housing is permitted to twist freely, or at least through a preselected angle of rotation. The handle system 19 is integrally attached to the fan housing 18 or the motor assembly 12 such that the orientation of the coupling portion 20, main handle portion 21, and the assist handle portion 26 to the power source 12 remains fixed. Both the main handle 21 and the assist handle 26 provide a means for holding and controlling the trimmer by a user. The adjustable assist handle 26 is bail shaped to allow a user to hold or grab the assist handle 26 from the top or from the side.

The position of the assist handle 26 with respect to the main handle portion 21 is adjustable in both a longitudinal direction (in the direction of the drive shaft housing), and in height above the drive shaft housing by pivotally connecting the assist handle to the handle system 19. Defined in the bottom of handle system 19 is a notch or saddle 34 for receiving a rod-shaped portion 36 of the assist handle 26 that connects side arms 35 of the assist handle. Bolt 31 extends through both a hole in both side arms 35 and through curved, elongated slots 30 defined through extension 28 of housing 22 located inside of, and adjacent to, the side arms 35. The assist handle is thus permitted to pivot within the notch 34, through a range limited by the length of curved slot 30. One end of the bolt includes a knob 29 which can be tightened to fix the position of the assist handle and loosened to permit its pivoting to a new position. The head of the bolt 31 is countersunk in place to prevent the bolt 31 from rotating.

Now referring to FIG. 2, inside the coupling portion 21 of two-piece housing 22 of the handle system 19 is a coupler 38, a spring 40 and a collar 50. The coupler 38 includes a sleeve-shaped tubular section which fits over the drive shaft housing 32 and through which the drive shaft housing passes. The drive shaft housing is permitted to freely rotated within the coupler. The coupler is permitted to slide longitudinally with respect to the handle system 19 and the drive shaft housing 32. However, it is restrained from rotating by a pair of guide ribs 42, with one guide rib 42 positioned on each side of the coupler 38, which engage complementary guide slots (not seen) formed on opposing inside surfaces of housing 22. The slots are longer than the ribs so that the coupler 38 is permitted to slide longitudinally as indicated by the position of the coupler outlined by dashed lines 48. To the coupler 38 is connected a manually-controlled actuator 46, which rests in a slot formed in the top of housing 22, as shown in FIG. 3. Compressed spring 40 normally urges the coupler forward and into engagement with collar 50, in the position shown by the solid lines.

Clamped to the drive shaft housing 32 is a collar 50. The position of the collar 50 is not permitted to move on the drive shaft housing. Additionally, the collar is constrained against longitudinal movement with respect to housing 22. On one side of the collar is wave washer 54, and on the other side is coupler 38. The collar 50 includes one or more teeth 52 for engaging one or more slots 44 in the coupler 38. It will be appreciated that the collar 50 and coupler 38 may contain any desired number of teeth and slots for allowing the drive shaft housing 32 to be rotated to any number of positions (e.g. 45, 90, 180 degrees, etc.) with respect to a normal position. The slot 44 of the coupler 38 functions to receive and engage a tooth 52 of the collar 50. In the engaged position, the drive shaft housing 32 cannot be rotated with respect to the power source due to the collar 50 being rigidly attached to the drive shaft housing 32, the coupler being restrained from rotating with respect to the housing 22, and the housing constrained against movement with the power source 12. To disengage the tooth 52 and slot 44, the coupler is slid away from the collar by pulling the actuator 46 toward the power source, thus permitting the drive shaft housing to freely rotate. The drive shaft housing 32 can be rotated to another position where the teeth on the collar align with the slots 44 of the coupler 38. For example, in the case of a flexible line trimmer having a curved shaft, it is desirable to be able to rotate the shaft one hundred, eighty degrees to comfortably use the trimmer to edge and to trim. Thus, two slots 44 formed on opposite locations on the end of the coupler 38 can be used to engage either one or two teeth 52. If the flexible line trimmer has a straight shaft, it is preferable to be able to rotate the shaft ninety degrees. Then the slots would be located ninety degrees apart and only one tooth 52 would be used.

Regardless of the orientation of the working end of the power tool, the orientation of the main handle 21 and the assist handle 26 remain fixed with respect to power source 12, thus avoiding the necessity of having to rotate the handles. To accommodate any shift in the center of gravity due to shaft rotation, the height and longitude of the assist handle can be adjusted.

The forgoing description is of a preferred embodiment only, intended to illustrate the invention. The invention should not be construed as being limited thereto, but, on the contrary, as encompassing such modifications thereof as should fall within the scope of the appended claims.

What is claimed is:

1. A power tool comprising:
    a power source;
    an elongated drive shaft within an elongated drive shaft housing for driving a working implement located proximate a first end of the tubular housing in a fixed relationship thereto, said drive shaft coupled to the power source;
    a main handle coupled in non-rotatable, fixed relationship to the power source and through which the drive shaft housing extends; and
    a coupling for selectively locking the rotational orientation of the tubular housing with respect to the handle and the power source;
    wherein the coupling comprises:
        a collar fixed to the elongated tubular housing; and
        a coupler fixed to the elongated tubular housing;
    a coupler mounted within the main handle for sliding in a longitudinal direction along the drive shaft housing between an engaged position with the collar in which rotation of the elongated drive shaft housing is locked against the main handle and a disengaged position in which the drive shaft housing is free to rotate at least through a predetermined angle with respect to the main handle and the power source.

2. The power tool in accordance with claim 1 wherein the collar and the coupler include complementary mating surfaces for locking the rotation of the drive shaft housing in one of a plurality of rotational orientations when in the engaged position.

3. The power tool in accordance with claim 1 wherein the plurality of rotational orientations includes a first orientation in which the plane of rotation of the working element is substantially parallel to the ground when the main handle is grasped in a normal operating position, and a second rotational orientation in which the plane of rotation of the working element is substantially vertical to the ground when the main handle is grasped in the normal operating position.

4. The power tool in accordance with claim 1 further comprising:
    a spring positioned proximate the coupler for longitudinally urging the coupler into engagement with the collar; and
    an actuator connected to the coupler for longitudinally moving and disengaging the coupler from the collar in response to a force applied to the actuator, thereby allowing the drive shaft housing to freely rotate at least through a predetermined angle with respect to the handle and the power source.

5. The power tool in accordance with claim 1 fiber including an auxiliary handle attached to the main handle.

6. The power tool in accordance with claim 5 wherein the auxiliary handle includes means for adjusting the distance of the auxiliary handle from the power source.

7. A portable power lawn and garden tool comprising:
    a power source;
    an elongated drive shaft housing;
    an elongated drive shaft within the elongated drive shaft housing for supplying power to a working implement located proximate a first end of the elongated drive shaft housing, said drive shaft coupled to the power source;
    a main handle having a first end and a second end, the first end coupled in non-rotatable, fixed relationship to the power source between the power source and the working element, the elongated drive shaft housing extending through the main handle; and
    a bail type assist handle coupled to the second end of the main handle in a fixed relationship thereto;
    wherein the assist handle is pivotally mounted to the second end of the main handle for adjustment of the distance between the assist handle and the power source.

8. The lawn and garden tool in accordance with claim 7 further comprising:
    a collar fixed to the elongated drive shaft housing; and
    a coupler mounted within the main handle for sliding in a longitudinal direction along the drive shaft housing between an engaged position with the collar in which rotation of the drive shaft housing is locked against the main handle and a disengaged position with the collar in which the drive shaft housing is free to rotate at least through a predetermined angle of rotation with respect to the main handle and the power source.

9. The lawn and garden tool in accordance with claim 8 further comprising:
    a spring positioned proximate the coupler for longitudinally urging the coupler into engagement with the collar; and an actuator connected to the coupler for longitudinally moving and disengaging the coupler from the collar in response to a force applied to the actuator thereby allowing the drives shaft housing to freely rotate at least within a predetermined angle of rotation with respect to the main handle.

10. The lawn and garden tool in accordance with claim 9 wherein the collar and the coupler include complementary mating surfaces for locking the rotation of the drive shaft housing in one of a plurality of rotational orientations when in the engaged position.

11. The lawn and garden tool in accordance with claim 8 wherein the coupler selectively locks the drive shaft housing in one of a plurality of positions, the plurality of rotational orientations including a first orientation in which the plane of rotation of the working element is substantially parallel to the ground when grasping the main and assist handles in a normal operating position, and a second rotational orientation in which the plane of rotation of the working element is substantially vertical to the ground when grasping the main and assist handles in the normal operating position.

12. A power tool comprising:

a power source;

an drive shaft within an elongated drive shaft housing for supplying power to a working implement located proximate a first end of the drive shaft housing, said drive shaft coupled to the power source;

a main handle through which a portion of the elongated drive shaft housing extends, the main handle having a rear end coupled in fixed relationship to the power source;

a collar coupled to the drive shaft housing;

a coupler slidably mounted within the main handle for longitudinal non-rotational movement with respect to the drive shaft housing;

a spring positioned proximate the coupler for urging the coupler into engagement with the collar, said coupler engaging the collar to lock the drive shaft housing to the main handle to prevent rotation and disengaging the collar to allow rotation of the drive shaft housing; and an actuator protruding through the main handle and coupled to the coupler for manually moving the coupler away from the collar in response to a force applied to the actuator, thereby disengaging the coupler from the collar and allowing the drive shaft housing to freely rotate with respect to the main handle and the power source.

13. The power tool in accordance with claim 12 wherein the collar and the coupler include complementary mating surfaces for locking the rotation of the tubular housing in one of a plurality of rotational orientations when in the engaged position.

14. The power tool in accordance with claim 13 wherein the plurality of rotational orientations includes a first orientation in which the plane of rotation of the working element substantially parallel to the ground when the main handle is grasped in a normal operating position, and a second rotational orientation in which the plane of rotation of the working element is substantially vertical to the ground when the handle is grasped in the normal operating position.

15. The power tool in accordance with claim 12 further including a bail-shaped assist handle mounted to a forward end of the main handle.

16. The power tool in accordance with claim 15 wherein the assist handle is pivotally mounted to the main handle for selectively adjusting of distance between the assist handle and the power source.

17. A powered lawn trimmer comprising:

a cutting element;

a power source for powering the cutting element;

an elongate member for maneuvering the cutting element while standing, the cutting element coupled in a normally fixed relationship on a front end of the elongated member and the power source mounted on an opposite; and an integrated handle system connected in a fixed relationship to a front end of the power source, between the power source and the working element, the handle system including a main handle portion, a coupling portion and an assist handle pivotally mounted for adjusting a distance between the assist handle and the main handle; wherein the elongate member extends through the handle system and the coupling portion selectively locks the elongate member against rotation and unlocks the elongate member to allow rotation through at least a predetermined angle with respect to the power source and handle system; and wherein the coupling portion is manually activated between a first position in which it locks the elongate member against rotation and a second position in which it unlocks the elongate member for free rotation through at least a predetermined angle with respect to the handle system and power source.

* * * * *